June 6, 1967   J. E. KILLPATRICK   3,323,411
APPARATUS FOR MEASURING ANGULAR VELOCITY HAVING
PHASE AND AMPLITUDE CONTROL MEANS
Filed June 29, 1964

INVENTOR.
JOSEPH E. KILLPATRICK
BY Charles J. Ungemach
ATTORNEY

United States Patent Office 3,323,411
Patented June 6, 1967

3,323,411
APPARATUS FOR MEASURING ANGULAR VELOCITY HAVING PHASE AND AMPLITUDE CONTROL MEANS
Joseph E. Killpatrick, Minneapolis, Minn., assignor to Honeywell Inc., Minneapolis, Minn., a corporation of Delaware
Filed June 29, 1964, Ser. No. 378,658
10 Claims. (Cl. 88—14)

This invention relates to an electromagnetic wave apparatus for measuring angular rotation with respect to inertial space. More particularly, this invention relates to modifications and improvements of this apparatus to greatly increase its sensitivity and practicality. While the invention may be used with various coherent energy devices such as masers, irasers and lasers, for simplicity it will be described in connection with a laser angular rate sensor.

Devices employing lasers to generate light waves along a closed circuit path or cavity defined by mirrors are known in the art. In these devices, lasers are placed in the path of the light beam such that they can amplify and transmit the beam in both directions around the path. The whole apparatus is mounted so that it may experience rotation about an axis perpendicular to the plane of the path. Samples of the two beams, separated by a slight angle, are then directed at a photomultiplier tube, or other suitable detector. The slight angle produces an interference fringe pattern which is observed to move with a velocity proportional to the rate of angular rotation of the device about the axis. This fringe pattern movement is a result of the difference in frequency of the two beams caused by the beams moving both with and opposite to the direction of rotation. The rate of angular rotation is determined by measuring the velocity of fringe pattern movement.

A serious hindrance to the operation of the laser angular rate sensor has been a phenomenon called "lock-in." "Lock-in" occurs when the speed of rotation becomes small. The reason for this is believed to be that unwanted reflections of an inherently unavoidable nature cause light energy from the beam traveling in one direction to be directed into the beam traveling in the opposite direction. If this reflected energy has a frequency not too different from the frequency of the light already traveling in that direction the two beams tend to resonate together and combine to form a single frequency. Small frequency differences between the two beams occur at low angular velocities and the energy undesirably reflected from one beam to the other then causes "lock-in." Consequently, at low speeds no rotation rate can be measured, because the frequency difference disappears when the two beams combine.

Unwanted reflections can be caused by slight imperfections in any of the optical components, back scattering from the gas in the laser tubes, or reflections from the readout mechanism itself. Since these effects are extremely hard to avoid, attempts to eliminate unwanted reflections are largely fruitless.

The present invention operates to minimize the above mentioned limitations not by eliminating but by neutralizing the unwanted reflections with controlled reflections. Briefly, the present invention introduces into the closed circuit path a beam of energy equal in amplitude but opposite in phase to the sum of the undesirable reflections. Since opposite phased beams neutralize each other this beam cancels out the total sum of the undesirable reflections and minimizes or prevents "lock-in." For simplicity, the preferred embodiment extracts portions of the energy traveling in one or both directions, adjusts its phase and amplitude, and uses this to cancel the unwanted reflections. Accordingly, it is an object of this invention to provide an improved laser angular rotation sensor.

Further objects and advantages will become apparent in the following discussion and drawings, in which:
FIGURE 1 is a diagram of prior art laser angular rotation sensors;
FIGURE 2 is a schematic representation of one embodiment of my invention; and
FIGURE 3 is a diagram of another embodiment of my invention.

The operation of the prior art devices can best be described with reference to FIGURE 1. In FIGURE 1 a coherent energy source such as a laser 10 produces two beams of light energy traveling in opposite directions shown by arrows 13 and 15 around a closed circuit path 17 defined by energy reflecting surfaces 20, 21, 22 and 23. Laser 10 and surfaces 20–23 are mounted on a support or frame for rotation about an axis 25 which is perpendicular to the plane of the path 17. A half silvered mirror or beam splitter 27 is shown in FIGURE 1 mounted in the path 17 between reflecting surfaces 21 and 22 although its position in path 17 may be elsewhere. Beam splitter 27 is placed at an angle with respect to the path 17 so that some of the energy traveling in the direction shown by arrow 13 is directed down to a "detector" 30 while most of the energy is passed through and continues around path 17. Detector 30 may be any standard light sensitive device such as a photomultiplier tube. In a similar manner some of the energy traveling in the direction shown by arrow 15 is reflected by beam splitter 27 upwardly in FIGURE 1 to a reflecting surface 35 where it is reflected back through beam splitter 27 to detector 30. The position of beam splitter 27 and mirror 35 are adjusted so that the two beams arrive at detector 30 at a slight angle with respect to each other to thus create an interference pattern. When the apparatus is stationary the frequency of the light traveling in the direction shown by arrow 13 is substantially the same as the frequency of the light traveling in this direction 15. However, when the apparatus is caused to rotate about axis 25 the frequency of the light traveling in the two directions will change with respect to each other since one beam is traveling in the same direction as the rotation while the other is traveling in the opposite direction. This frequency difference appears at detector 30 as a moving fringe pattern or alternating light and dark areas. The speed of rotation of the system is determined by the frequency of the alternate dark and light signals at the detector caused by the dark and light bands of the fringe pattern moving past the detector.

An output from detector 30 indicative of this speed is shown in FIGURE 2 as an output connection 31 and is presented to a suitable amplifier 32. The output of amplifier 32 is presented to a frequency meter 34 by connection 33. Meter 34 may be any suitable frequency measuring device or circuit.

As shown in FIGURE 1 some of the light traveling in direction 15 and reflected from beam splitter 27 to reflector 35 is reflected back to the beam splitter 27 and thence to the right or in direction 13. Thus, some of the energy from the beam traveling in direction 15 is reflected into the direction 13 where it could cause "lock-in." Likewise, some energy could also be reflected from detector 30 back into the system in the opposite direction to cause "lock-in."

Apparatus for minimizing or preventing "lock-in" is described in the embodiment of my invention described in FIGURE 2. This diagram is similar to FIGURE 1 in that a laser 36 generates light beams 37 and 38 in two directions around a path defined by mirrors 45, 46, 47 and 48 and compares them at a detector 50 after a beam splitter 51 and a mirror 53 have separated them at a slight angle. However, in FIGURE 2 mirror 47 is a semi-silvered mirror which unlike any corresponding mirror of FIGURE 1 partially transmits beams 38 and 37 through a pair of polarized filters 54 and 55 to a pair of mirrors 56 and 57 respectively. Beams 38 and 37 are reflected by mirrors 56 and 57 back into the system in the opposite direction. Mirrors 56 and 57 are connected to means for controlling their position such as precision screws 58 and 59. These screws are used to move mirrors 56 and 57 in such a way as to lengthen or shorten the effective path length of light beams 38 and 37, and thus control the phase of the light reflected back into the system. A pair of Brewster windows 60 and 61 affixed to laser 36 are utilized in FIGURE 2 to polarize the light beams 38 and 37 in the plane of the paper. Filters 54 and 55 are polarized in such a direction that when rotated about an axis coaxial with light beams 38 and 37 as for example by adjusting knobs 62 and 63 operating through mechanical connections indicated by dashed lines 64 and 65 the magnitude of the reflections of beams 38 and 37 are varied. The mechanical connections 64 and 65 may be worm gears or any other connections suitable for fine adjustment of the polarized filters 54 and 55. By varying the polarizing angles of filters 54 and 55, with respect to the fixed polarization of beams 38 and 37, caused by Brewster windows 60 and 61, the magnitude of the light waves reflected by mirrors 56 and 57 can be controlled. To eliminate the "lock-in" in the system the magnitude and phase of the reflected light waves are adjusted until they are equal in magnitude and opposite in phase to the sum of the reflections from within the system caused by the uncontrollable sources. Since opposite phased equal amplitude waves cancel each other the "lock-in" causing reflections are eliminated and "lock-in" is prevented. The correct adjustment may be determined by trial and error for example.

While the preferred embodiment uses two sets of mirrors and filters, it should be understood that the cancellation of "lock-in" can be accomplished by only one mirror and filter, for instance, mirror 56 and filter 54.

FIGURE 3 shows another embodiment of my invention in which only three mirrors (71, 72, and 73) are used. The number of mirrors is not critical to the device, and many more could be used successfully. In FIGURE 3, laser 74 generates light beams 75 and 76, which are polarized by a pair of Brewster windows 78 and 79 and directed to a detector 85 by readout mirrors 81 and 82, as explained previously. In order to cancel lock-in, a beam splitter 94 is inserted in the light beams 75 and 76 going to detector 85. The beam splitter directs a small fraction of each beam through a rotatable window 96 and a polarizing filter 98 to a mirror 100 where it is reflected back through window 96 and filter 98 to beam splitter 94 and back into the system. A pair of knobs 101 and 102 control window 96 and filter 98 by means of mechanical connections shown in FIGURE 3 as dashed lines 104 and 106. These connections can be similar to the connections mentioned in regard to FIGURE 2. Rotation of window 98 about an axis 107 which is perpendicular to the light beams 75 and 76 changes the effective path length from beam splitter 94 to mirror 100 and thus provides the phase adjustment. Rotation of polarizing filter 98 adjusts the magnitude as described previously and consequently, the reflections can be controlled to cancel internal reflections, as already described.

Polarization can be accomplished in ways other than using Brewster windows. A polarized filter in the light path, or a group of horizontal wires in the laser tube will polarize the light as desired. Polarizing need not be employed at all. Any device which will control the amplitude of the light wave, such as a variable density filter, a mirror with a varying coefficient of reflectivity, or a curved mirror to disperse the light can be substituted for the polarization technique. Similarly, changing the effective path length is not the only way of adjusting the phase of the reflected light. For instance, the reflected light could be passed through a Kerr cell to control the phase.

It will be apparent to those skilled in the art that many variations, modifications, and applications of the invention can be conceived without departing from the spirit or scope of the invention as defined by the appended claims.

I claim as my invention:

1. Compensated electromagnetic wave apparatus for measuring angular velocity comprising:
    means for generating a first and a second electromagnetic wave beam in opposite directions around a closed path;
    means for combining said first and second beams to produce an electromagnetic wave interference pattern;
    means to measure the movement of said interference pattern; and
    means for introducing a phase and amplitude controlled third electromagnetic wave beam into said closed path so as to cancel unwanted reflections.

2. The method of minimizing "lock-in" in a coherent energy angular rate sensor comprising the steps of:
    extracting a portion of the energy from the sensor;
    adjusting the phase and amplitude of the extracted energy; and
    returning the adjusted energy to the sensor so as to cancel unwanted reflections.

3. Apparatus for use with a coherent energy angular rate sensor to minimize "lock-in" comprising:
    means for extracting from the sensor a portion of the energy traveling in a first direction;
    means for adjusting the phase and amplitude of the energy extracted; and
    means for returning the phase and amplitude adjusted energy to the sensor in a direction opposite to the first direction.

4. Compensated electromagnetic wave apparatus for measuring angular velocity comprising:
    means for generating two electromagnetic wave beams in opposite directions around a closed path;
    means for combining said beams to produce an electromagnetic wave interference pattern;
    means to measure the movement of said interference pattern as an indication of angular velocity;
    means for reflecting a portion of one of said beams an opposite direction; and
    means for controlling phase and magnitude of said reflected beam.

5. Compensated electromagnetic wave apparatus for measuring angular velocity comprising:
    means to generate two light waves in first and second directions opposite to each other around a polygonal path;
    means to extract portions of said waves;
    means to combine said portions of said waves so as to produce an interference pattern;
    means to measure the change in said interference pattern as an indication of angular velocity;
    means for reflecting light from said first direction into said second direction; and
    means to control the phase and amplitude of said reflected light.

6. Apparatus for use with a coherent electromagnetic energy angular rate sensor which includes a first energy beam traveling in first direction around a closed circuit path comprising:
    means for altering the phase and amplitude of an electromagnetic energy beam and for changing its direction; and
    means mounting said last named means to receive a portion of the first energy beam to alter its phase and amplitude and to introduce the altered energy beam in the closed circuit path in a direction opposite the first direction.

7. Apparatus according to claim 1 including rotatable means for mounting said apparatus.

8. Apparatus according to claim 5 including rotatable means for mounting said apparatus.

9. Apparatus to minimize "lock-in" in an angular rate sensor having a coherent energy source producing first and second energy beams traveling in opposite directions around a closed circuit path and in which undesirable reflections of energy from the first beam into the second beam cause "lock-in," the apparatus comprising:
   means for extracting a portion of the energy from the sensor;
   means for adjusting the phase and amplitude of the extracted energy so that the magnitude is substantially the same as but the phase is substantially opposite to the undesirable reflections; and
   means for returning the phase and amplitude adjusted energy to the sensor so as to substantially cancel the undesirable reflections and minimize "lock-in."

10. Compensated electromagnetic wave apparatus for measuring angular velocity comprising:
   rotatable mounting means for said apparatus;
   means for generating two identical polarized light waves in opposite first and second directions around a closed circuit path;
   means for comparing said polarized waves as an indication of angular velocity;
   means for reflecting one of said polarized waves from said first direction into said second direction;
   means for controlling phase and amplitude of said reflected waves including means to vary the effective path length of said reflected waves; and means to vary the amount of polarized light reflected.

References Cited

UNITED STATES PATENTS 2,147,810   2/1939   Alford _____ 343—12

OTHER REFERENCES

Macek et al.: "Rotation Rate Sensing With Traveling-Wave Ring Lasers," Applied Physics Letters, vol. 2, No. 3, Feb. 1, 1963, pp. 67 and 68.

Macek et al.: "Ring Laser Rotation Rate Sensor," Proceedings of the Symposium on Optical Masers, vol. XIII, published by the Polytechnic Press of the Polytechnic Institute of Brooklyn, Brooklyn, N.Y., 1963, pp. 199–207.

Sperry Rand: "Laser Gyro's New Configuration," Electronics, vol. 36, No. 26, June 28, 1963, page 82.

JEWELL H. PEDERSEN, *Primary Examiner.*

J. K. CORBIN, *Assistant Examiner.*